United States Patent
Rambosek et al.

(10) Patent No.: US 6,353,514 B1
(45) Date of Patent: Mar. 5, 2002

(54) TWO-SIDED COMPLIANT TAPE GUIDE

(75) Inventors: G. Phillip Rambosek, Shafer, MN (US); Leif O. Erickson, River Falls, WI (US); William J. Vanderheyden, Loveland, CO (US)

(73) Assignee: Imation Corp., Oakdale, MN (US)

( * ) Notice: Subject to any disclaimer, the term of this patent is extended or adjusted under 35 U.S.C. 154(b) by 64 days.

(21) Appl. No.: 09/596,595

(22) Filed: Jun. 19, 2000

(51) Int. Cl.$^7$ .............................................. G11B 15/60
(52) U.S. Cl. .................... 360/132; 360/130.21; 242/346
(58) Field of Search ........................... 360/130.21, 132; 242/346

(56) References Cited

U.S. PATENT DOCUMENTS

| | | | |
|---|---|---|---|
| 4,646,177 A | * | 2/1987 | Sandford et al. .............. 360/95 |
| 5,251,844 A | | 10/1993 | Albrecht et al. ............. 242/179 |
| 5,294,072 A | | 3/1994 | East et al. ................... 360/132 |
| 5,430,922 A | | 7/1995 | Church et al. .............. 329/407 |
| 5,447,279 A | | 9/1995 | Janssen et al. .............. 242/358 |
| 5,490,029 A | | 2/1996 | Madsen et al. ............. 360/132 |
| 5,504,983 A | * | 4/1996 | Church et al. ............. 29/281.1 |
| 5,519,562 A | * | 5/1996 | Argumedo et al. .... 360/130.21 |
| 5,870,924 A | | 2/1999 | Fahimi et al. ......... 360/130.21 |
| 5,969,913 A | | 10/1999 | Vanderheyden et al. .... 360/132 |
| 6,118,630 A | * | 9/2000 | Argumedo ............. 360/130.21 |
| 6,142,404 A | | 11/2000 | Willems et al. .............. 242/346 |
| 6,205,001 B1 | * | 3/2001 | Vanderheyden et al. .... 360/132 |

OTHER PUBLICATIONS

"Continuous Compliant Tape Guide," D.E. Griffiths, IBM Technical Disclosure Bulletin, vol. 15, No. 8, Jan. 1973, p. 2502.

"Air Supprted Compliant Tape Guide," Arseneault et al., IBM Technical Disclosure Bulletin, vol. 17, No. 4, Sep. 1974, p. 966.

"Air Bearing Tape Guide," Clegg et al., IBM Technical Disclosure Bulletin, vol. 25, No. 1, Jun. 1982, pp. 447–448.

"Compliant Tape Guide," Clegg et al., IBM Technical Disclosure Bulletin, vol. 25, No. 2, Jul. 1982, pp. 809–810.

"Web–Guiding Stress Functions," Winarski, IBM Technical Discloure Bulletin, vol. 25, No. 4, Sep. 1982, p. 2069.

"Antimodal Compliant Tape Guide," Johnson et al., IBM Technical Disclosure Bulletin, vol. 26, No. 7A, Dec. 1983, p. 3398.

"Tape Guide Design," Andresen et al., Johnson et al., IBM Technical Disclosure Bulletin, vol. 27,No. 7B, Dec. 1984, pp. 4360–4361.

"Compliant Guide Assembly with High Wear Resistance Contact Pads," IBM Technical Disclosure Bulletin, vol. 29, No. 5, Oct. 1986, pp. 2126–2127.

"Tape Guide Assemblies with Weighted Buttons," IBM Technical Disclosure Bulletin, vol. 31, No. 3, Aug. 1988, pp. 232–233.

"Compliant Cleaner Blade Tape Guide," IBM Technical Disclosure Bulletin, vol. 32, No. 3B, Aug. 1989.

* cited by examiner

Primary Examiner—Jefferson Evans
(74) Attorney, Agent, or Firm—Eric D. Levinson

(57) ABSTRACT

A data storage cartridge includes a length of magnetic tape wound on a pair of tape reels within a housing to define a tape path. A tape guide disposed along a portion of the tape path includes a top and bottom flange. Each flange is resilient so that it acts to resiliently guide an edge of the tape. This minimizes violent crashes of a tape edge against the tape guide. Each flange may have a plurality of spaced resilient finger guides for directly contacting the edges of the tape. The finger guides serve to independently exert a force on the edges of the tape, thereby guiding the tape.

15 Claims, 5 Drawing Sheets

TWO-SIDED COMPLIANT TAPE GUIDE

TECHNICAL FIELD

This invention relates to guiding magnetic storage tape along a tape path, and more specifically to compliant-type tape guides.

BACKGROUND ART

Tape cartridges for tape carrying digital data on a number of tracks across a magnetic tape are well known. There are generally three types of such data storage cartridges. Single reel cartridges comprise a spool of tape which is provided to a user along with a leader block positioned at one end thereof. In operation, the user places the spool in a drive mechanism which functions to thread the tape for receipt by another reel. The tape is transported between the two reels and data is read and/or written. The drive mechanism is responsible for providing guiding of the tape as it passes by a head such as, for example, a transducer. The drive mechanism also functions to provide tape tension by, for example, servoing the reels as they change their diameters during the read/write process.

Dual reel data cartridges, also called "hub-driven" cartridges, include two or more spools or "hubs" integral to the cartridge. Placement of the hubs within the cartridge itself obviates the time and effort required for tape threading and, therefore, permits significantly faster access over conventional single reel cartridges. The internal placement of the hubs further permits the use of an external protective covering or shell which functions to protect the hubs and the tape from contaminants during both storage and use. In operation, respective drive motors engage the spools. In further contrast to the aforementioned, single reel cartridges, dual reel data cartridges also include tape guiding means for guiding the tape past the head or transducer. Typically, the guiding means comprises one or more rigid flanges such as fixed guides or pins. See, for example, U.S. Pat. No. 5,870,924 to Fahimi et al. which discloses a tape bearing surface usable as a front guide assembly.

Belt-driven data cartridges, like dual reel cartridges, incorporate the tape within the cartridge itself and include two or more spools or hubs. Unlike, dual reel cartridges, belt-driven data cartridges further include an elastic drive belt operative to engage the tape at the respective tape-spool peripheries and provide tape tension. More specifically, tape cartridges of this type include a cartridge shell that defines an enclosure, and a pair of tape reels supported within the enclosure. A length of magnetic tape extends along a tape path within the enclosure. Each end of the tape is wound onto one of the reels. Like dual reel cartridges, the tape moves past suitable guides or flanges and across an opening in an edge of the cartridge into which a read/write head or transducer protrudes to tension the tape and write or read data when the cartridge is inserted into a recording/reproducing machine.

Regardless of the type of data cartridge used, the process for reading and writing data remains substantially the same. That is, data is written across all or substantially all of each respective track. Data is read, however, from only a portion of each track. In this manner, allowances can be made for read errors resulting from shifts in the magnetic tape. As those skilled in the art will recognize, such shifts, called track misregistrations (TMRs) may be caused by numerous events, such as, for example, slamming of a tape edge against a fixed flange (reference edge), tolerance differentials between one or more tape guides and the data cartridge substrate, etc. Any one or more of these events may result in a TMR.

In prior art data cartridges where tracks were written linearly on magnetic tapes, a small number of relatively wide data tracks (10 or less) were used. Conventional methods for tape edge guiding were, therefore, generally sufficient. As long as the tape was maintained within a predetermined critical area, data could be written and read consistently.

Advances in tape manufacture, coupled with the desire to read and write more information on individual cartridges, however, has altered the control scenario dramatically. Presently, data cartridges have substantially more data tracks (100 or more), each of which is substantially narrower (micrometers in width) than prior art linear written tracks. As a result, much tighter control is necessary to prevent TMR events.

To ensure that the cartridge tapes are properly positioned so that each of the very narrow individual tracks having data are appropriately positioned as they cross the read/write head, it is necessary that the tapes be guided precisely along their paths of travel. Closed loop systems have, therefore, been used for positioning data storage cartridge tapes. Such servo systems incorporate servo tracks written on magnetic tapes which are followed by a tracking head. The servo tracking head operates to control the position of the head or transducer to ensure that it is properly aligned with the tape. As TMRs cause the tape to move, the servo tracking head causes the head to move in step thus maintaining the head within the critical read area of the tape.

Although servo systems have greatly addressed the problems associated with TMR events, they have created new control problems of their own. As indicated above, such servo systems function to sense and address TMRs by following movement of written servo tracks on the magnetic tapes. Conventional read/write heads, however, have limited bandwidth. Therefore, they are not capable of following very fast motions such as those which result from reflections ("slamming") of the magnetic tape off of a fixed tape guide. As a result, "servo off track" events occur wherein the servo system is unable to properly align the head with the tape. As a result, the head must back up and again attempt to perform the read or write function. This "servo transient" event is undesirable as it results in unnecessary use of system resources and increases the time required for the read/write process.

To address servo transient errors, spring-loaded pads have been proposed for use as bottom flanges on each of the front guide assemblies. These flanges are typically comprised of thin foils which apply a light load (approximately 2 grams nominal per pad or 4 grams edge force) as the tape runs between the front guide assembly.

A dual reel data cartridge incorporating the above spring loaded pads is shown in FIG. 1 and designated generally by reference numeral 10. Cartridge 10 defines an enclosure, not shown, in which a pair of reels 12 and 14 are supported for free rotation about substantially parallel axis. A length of magnetic tape 16 is moved along a tape path established by front guides 18 and 20. The opposite ends of tape 16 are connected to reels 12 and 14. Guides 18 and 20 each include pads 22 which, as indicated above, are thin foils which function to apply a light load on the bottom edge of tape 16 in order to register it against the respective top flanges 24 and 26 of guides 18 and 20.

It has been found, however, that these "compliant guides" do not prevent off-track events due to rapid tape movement. Moreover, the high edge force required to address steering effects resulting from tolerance differentials between the hubs 12 and 14 and the base plate 28 results in excessive wear on the tape edge, particularly, the fixed edge, here top edge 30. Furthermore, violent crashes of the tape edge against the fixed edge can damage the tape.

SUMMARY OF THE INVENTION

The present invention provides a data storage cartridge having an improved tape guide which overcomes the above-noted problems of durability, tape misregistration, servo off-track events, and servo transient events.

In carrying out the above object, there is provided a data storage cartridge including a cartridge housing. The storage cartridge further includes one or more (e.g., two) tape reels rotatably mountable within the housing. A length of magnetic recording tape is wound on the reel or reels such that a portion of the recording tape extends from one reel to the other along a tape path. The improved tape guide is disposed along a portion of the tape. The tape guide comprises a vertical guide wall to provide a surface for slidably engaging the tape as the tape is guided along the tape path portion.

The tape guide has upper (top) and lower (bottom) resilient reference flanges for supporting respective edges of the tape being guided. By having both flanges be resilient, instead of just one flange, violent crashes of the tape edge against a fixed flange, which might otherwise occur, are greatly reduced. In one embodiment, each of the flanges includes a plurality of spaced resilient finger guides affixable thereto for directly contacting the edges of the tape. Each finger guide is operative to independently exert a force on the edges of the tape. In a preferred embodiment, the finger guides extend from a flat sheet which may be semi-circular in shape or any other suitable shape. Each of the finger guides is operative to exert a gentle force on the tape edge which is preferably less than 1 gram and more preferably less than 0.5 grams, and most preferably, less than 0.2 grams per finger. The plurality of finger guides may include 2, 3, 5, 10, or 17 or more finger guides. In one embodiment, only one of the flanges has a plurality of finger guides.

The invention also includes a tape guide for guiding a length of magnetic data storage tape. The tape guide has top and bottom resilient reference flanges, which may include a plurality of spaced finger guides on at least one of the flanges for exerting a force on the edges of the tape. The tape guide may be present in a cartridge, in a drive, in a servowriter, etc. These and other objects, features, and advantages of the present invention will be more readily apparent with reference to the following drawings wherein like reference numerals correspond to like components.

DETAILED DESCRIPTION

Figure 1:
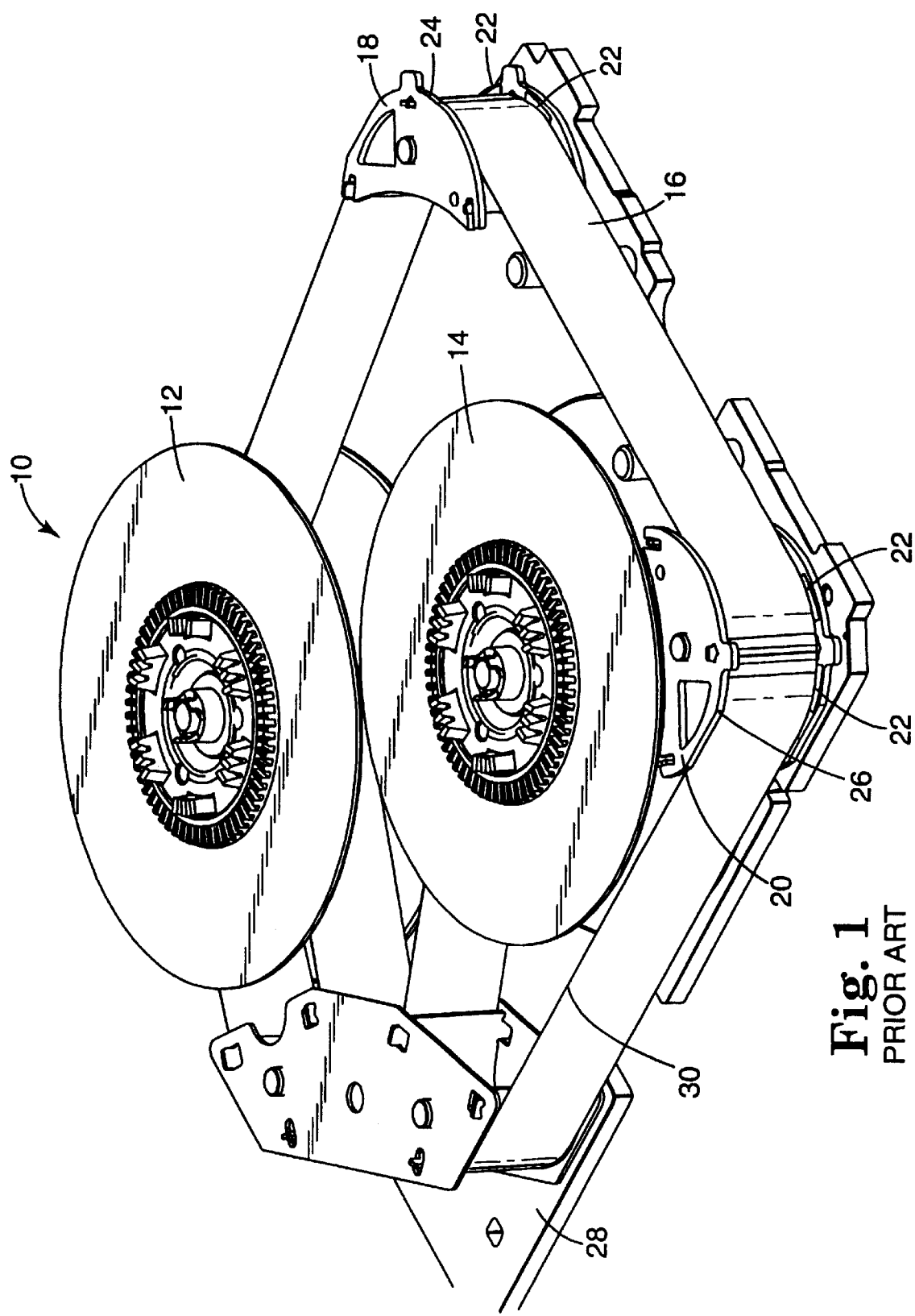
FIG. 1 is a perspective diagram of a prior art dual reel data cartridge incorporating a compliant front guide assembly.
Figure 2:
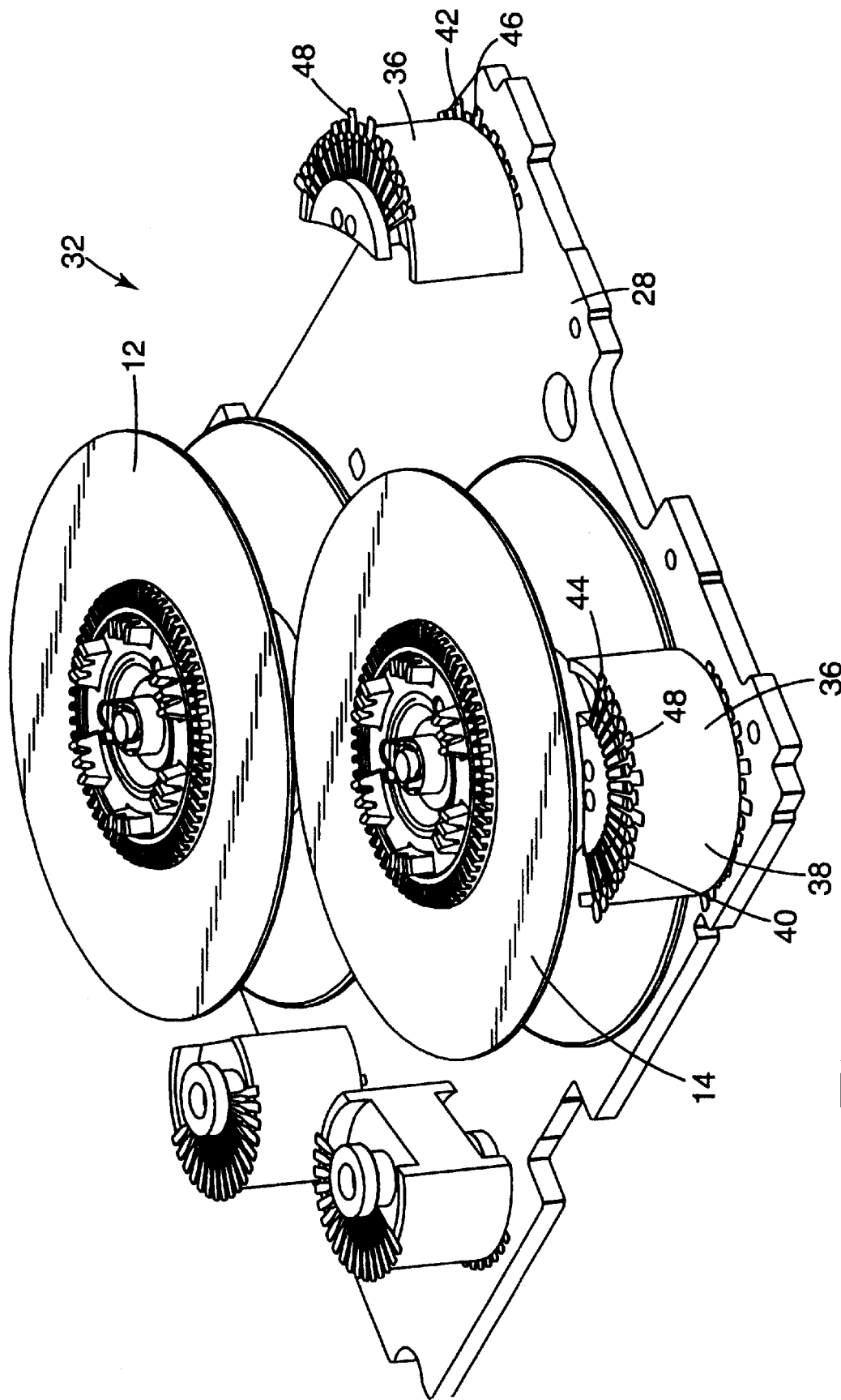
FIGS. 2 and 3 are perspective diagrams of a dual reel data cartridge incorporating the tape guide of the present invention.
Figure 3:
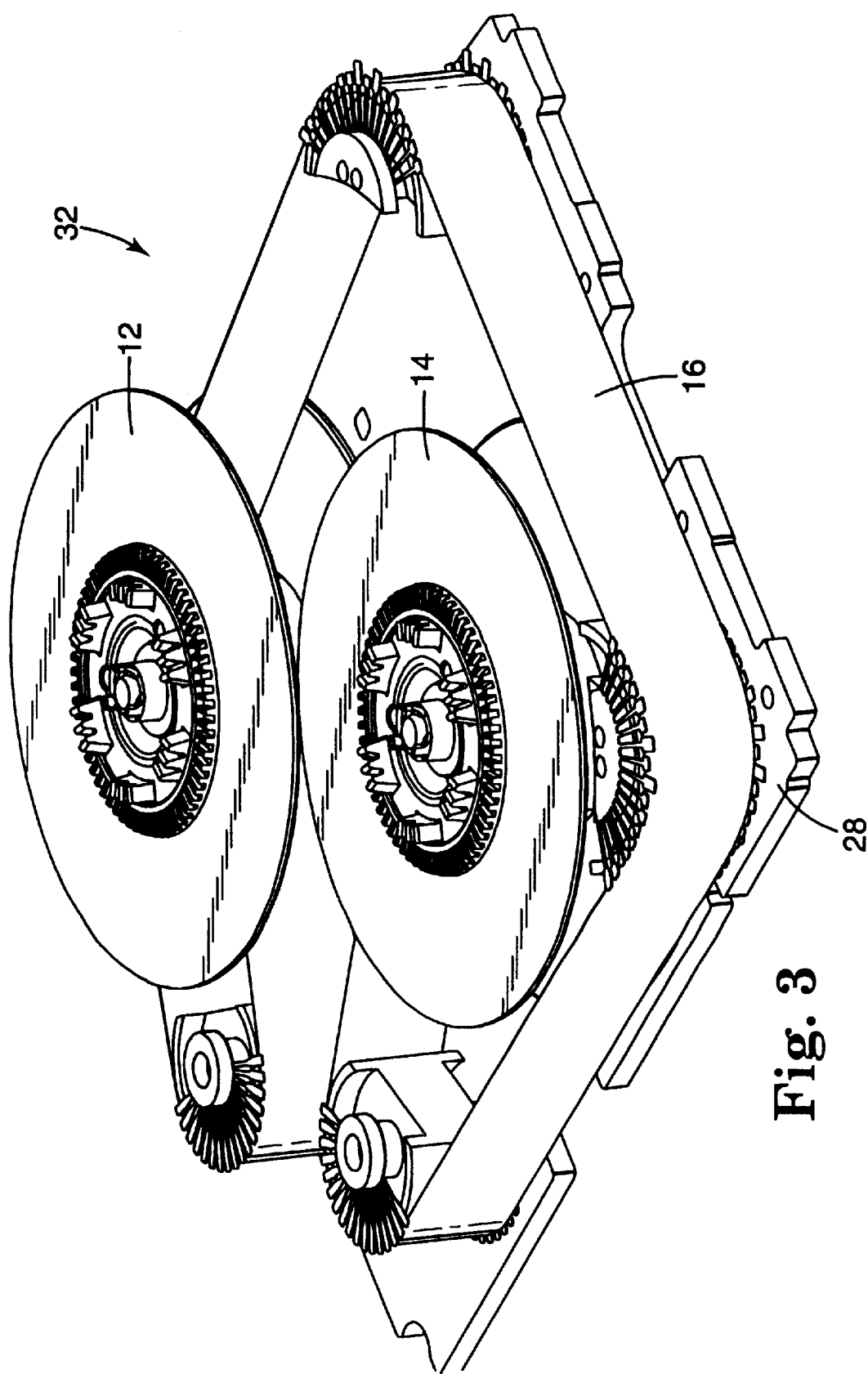

Referring to FIGS. 2 and 3 of the drawings, a tape cartridge indicated generally at 32 is provided for carrying data. Like the prior art cartridge shown in FIG. 1, cartridge 32 defines an enclosure (not shown) in which a pair of reels 12 and 14 are supported for free rotation about spaced and substantially parallel axis. A length of magnetic tape 16 is moved along a tape path established by suitable guides as explained below. The opposite ends of tape 16 are connected to reels 12 and 14.

The cartridge shown in FIGS. 2 and 3 is a dual reel cartridge also called a "hub-driven" cartridge. While dual reel cartridge 32 is shown for exemplary purposes, the tape guide of the present invention may be used in any suitable data cartridge including, without limitation, single reel cartridges and belt driven cartridges, as well as equipment such as tape drives, tape servo writers, etc., where it is desired to provide improved tape guidance. Cartridge 32 includes a base plate 28 made of aluminum, or other suitable material, and a cover (not shown) made of a clear or translucent polymer or other suitable material to form the tape cartridge enclosure. The cover is removably fastenable to base plate 28 with conventional snap fasteners (not shown). Screw bosses (not shown) may be provided as needed for attachment of parts to the base plate 28 and/or a suitable cover.

A path for the magnetic tape 16 is defined with respect to the reels 12 and 14 by the use of one or more tape guides 36 made according to the teachings of the present invention and explained herein. The guides 36 position the tape properly in the region where the tape is engaged with a transducer or read/write head.

Base plate 28 is a relatively rigid plate, generally made of aluminum or other suitable material to provide support. Tape guide 36 is held in place by any select one of a number of known fasteners. For example, screws may be mounted in apertures in the base plate 28 (not shown) and securely held in place in the base plate 28 at the desired locations. Alternatively, tape guide 36 may be mounted to base plate 28 by any suitable method such as, for example, ultrasonic welding, resistance welding, staking, etc.

Tape 16 is guided by tape guide 36 along a portion of its path of movement between reels 12 and 14. Tape guide 36 has an upright guide wall 38 that has a surface generally perpendicular to the base plate 28 when installed. Tape guide 36 includes upper and lower flanges 40 and 42 defining respective reference support shoulders 44 and 46 to position the upper and lower edges of tape 16.

According to the present invention, each of the upper and lower flanges 40 and 42 are resilient. In other words, tape guide 36 is a compliant tape guide where both the upper and lower flanges are resilient or compliant. This allows both flanges to independently maintain contact with both edges of the tape, thereby minimizing the likelihood of violent crashes between the edge of the tape opposite that which contacts a flexible flange and the respective flange.

Tape guide 36 may comprise a plurality of resilient finger guides 48 for exerting a force on respective top and bottom edges of tape 16. Finger guides 48 are designed to directly contact the tape edges, in contrast to prior art guides which contact a foil or other unitary surface, which in turn contacts the tape edges. Thus, in the case of the prior art guides, because the springs contact a foil, the tape is guided not by the individual springs, but rather by the foil. According to the present invention, each finger guide 48 is operative to directly contact the tape edge to apply a force on the tape edge. This allows tape guide 36 to better guide tape 16, thereby improving guiding while minimizing wear on the tape edges.

Figure 5:
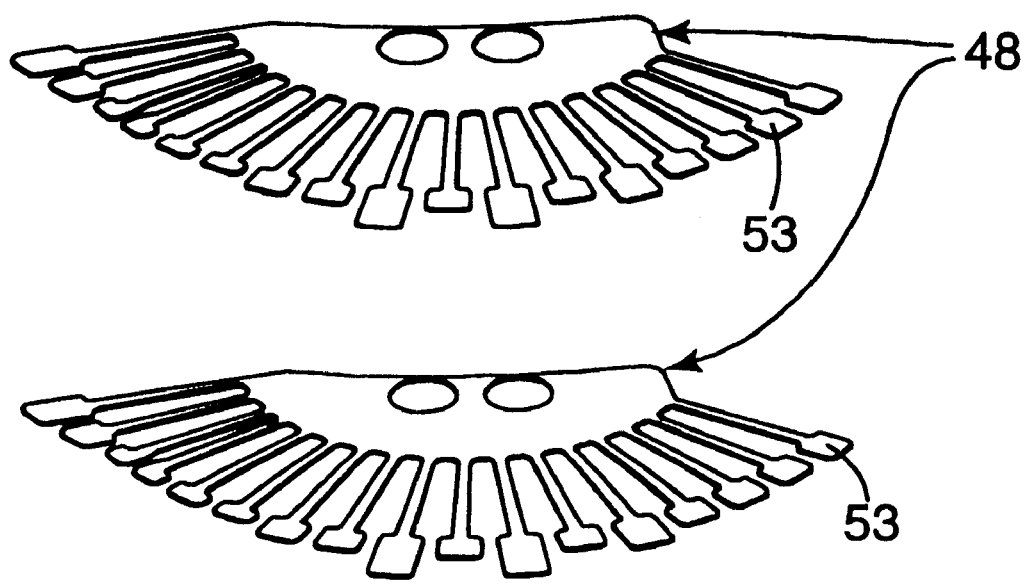
FIG. 5 is a perspective view of the guide fingers of the tape guide of the present invention.

The force required to guide tape 16 without damage may vary with the application. In a preferred embodiment, a force of less than 1 gram per finger is sufficient. More preferably, the force per finger guide should be less than 0.5 grams, still more preferably less than 0.2 grams, and in certain circumstances, even less than 0.1 grams. There are at least 2 finger guides per flange, and more preferably at least 3. It is still more preferable to have at least 5 finger guides and, more preferably, more than 10. There may be as many as 17 or more finger guides, as shown in FIG. 5. Preferably, each finger guide should act independently of the other finger guides.

Tape guide 36, and in particular finger guides 48, may be made from any suitable material including without limitation, plastic, ceramic, metal or any combination thereof in any suitable manner including extrusion, shearing, stamping, etching, forming, etc. In a preferred embodiment, however, finger guides 48 are made of stainless steel or other suitable metal in a stamping or etching process or any other suitable manner. If formed in a stamping process, it will be desirable to affix the finger guides with the rolled or "burr" edge facing away from the tape as the radius edge will be flatter.

Figure 4:
FIG. 4 is an exploded perspective view of the tape guide of the present invention.

As shown in FIGS. 3–5, in the preferred embodiment, finger guides 48 extend from a flat sheet which is substantially semi-circular in shape. However, it is recognized that any suitable shape may be used. Finger guides 48 may also be combined with or incorporated within other tape guides including without limitation, elongated tape guides, multi-piece tape guides or any other guide assembly used within a data cartridge, a servo writer, a drive mechanism or any other equipment where it is desired to provide tape edge guiding.

A portion of finger guides 48 may be affixable to tape guide 36 to form respective top and bottom flanges. Alternatively, finger guides 48 may be removably or permanently affixed to existing flanges. Any suitable attachment method may be used including without limitation screws 49 through plates 50 and 52 for attachment to base plate 28.

Any number, size, length, width, or shape of finger guides may be used depending on the application. All other variables being the same, the narrower the individual finger guides 48, the less edge force will be applied. Consequently, the thickness and/or rigidity of the fingers will need to be adjusted accordingly. Finger guides 48 may be the same thickness or one of the guides may be thicker to function as a reference edge. If the same or substantially the same thickness is used, adjustments will need to be made in the coding of the applicable drivers to determine the proper reference edge. Still further, the individual fingers 48 of each guide may have different lengths, widths, etc., depending on the desired edge force.

Finger guides 48 may also have various shaped pads 53 for contact with the respective edges of tape 16. Although shown herein as rectangular, pads 53 may, for example, be round, oval, square, triangular, etc. The individual pads 53 may also have varying widths and sizes depending on the desired force to be applied and the resiliency desired for proper tape guidance. One or more finger guides 48 and/or pads 53 may also be coated, deposited, or formed with suitable inks, polymers, dyes, or other material to provide additional support or dampening or to protect the finger or tape edge during use. Finger guides 48 may also be individual wires.

Tape guide 36 need not have finger guides but it must have resilient flanges or shoulders for guiding both edges of the tape. While both flanges should be resilient, one flange may be less resilient than the other, in which case the less resilient flange can act as a "reference" flange for guiding the tape.

What is claimed is:

1. A data storage cartridge, comprising:
   a cartridge housing;
   a pair of tape reels rotatably mounted in the housing on spaced, substantially parallel axes;
   a length of magnetic tape having two edges wound on the reels such that a portion of the tape extends from one reel to the other along a tape path; and
   a tape guide disposed along a portion of the tape path, the tape guide comprising a top resilient flange and a bottom resilient flange, wherein each of the flanges includes a plurality of spaced resilient finger guides for directly contacting the edges of the tape, wherein each finger guide is operative to exert a force of less than 0.5 grams, whereby each finger guide is operative to independently exert a force on the edges of the tape.

2. The cartridge of claim 1, wherein each finger guide is operative to exert a force of less than 0.2 grams.

3. The cartridge of claim 1, wherein each flange has at least five finger guides.

4. The cartridge of claim 1, wherein each flange has at least ten finger guides.

5. The cartridge of claim 1, wherein the finger guides extend from a substantially flat plate affixable to the top or bottom flanges.

6. The cartridge of claim 5, wherein the plate is semi-circular in shape.

7. The cartridge of claim 1, wherein one of the flanges is more resilient than the other flange.

8. A tape guide for guiding a length of magnetic data storage tape having two edges along a tape path, the tape guide having top and bottom flanges for contacting the edges of the tape, wherein both of the flanges are resilient, wherein both flanges have a plurality of spaced resilient finger guides for directly contacting the edges of the tape, and wherein each finger guide is operative to exert a force of less than 0.5 grams, whereby both edges of the tape are guided by the finger guides.

9. The guide of claim 8, wherein each finger guide is operative to exert a force of less than 0.2 grams.

10. The guide of claim 8, wherein each flange has at least 5 finger guides.

11. The guide of claim 8, wherein each flange has at least 10 finger guides.

12. The guide of claim 8, wherein one of the flanges is more resilient than the other flange.

13. A data storage cartridge comprising:
    a housing;
    at least one tape reel;
    a length of magnetic tape having two edges wound on the at least one tape reel and extending along a tape path; and
    at least one tape guide disposed along the tape path, the tape guide comprising a top and bottom resilient flange for contacting the edges of the tape, wherein at least one of the flanges includes a plurality of spaced resilient finger guides for directly contacting one edge of the tape, wherein each finger guide is operative to exert a force of less than 0.5 grams, whereby each finger guide is operative to independently exert a force on said one edge of the tape.

14. The cartridge of claim 13, wherein each finger guide is operative to exert a force of less than 0.2 grams.

15. The cartridge of claim 13, wherein one of the flanges is more resilient than the other flange.

* * * * *